(12) United States Patent
Ward et al.

(10) Patent No.: US 8,345,956 B2
(45) Date of Patent: Jan. 1, 2013

(54) CONVERTING 2D VIDEO INTO STEREO VIDEO

(75) Inventors: Benjamin Ward, Adelaide (AU); Sing Bing Kang, Redmond, WA (US); Eric Bennett, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 12/263,618

(22) Filed: Nov. 3, 2008

(65) Prior Publication Data
US 2010/0111417 A1  May 6, 2010

(51) Int. Cl.
G06K 9/00 (2006.01)
G06K 9/34 (2006.01)

(52) U.S. Cl. .................. 382/154; 382/173; 382/103
(58) Field of Classification Search .......... 382/154, 382/103, 173
See application file for complete search history.

(56) References Cited

U.S. PATENT DOCUMENTS

| | | | |
|---|---|---|---|
| 6,677,967 B2* | 1/2004 | Sawano et al. | 715/839 |
| 7,551,770 B2* | 6/2009 | Harman | 382/154 |
| 7,889,913 B2* | 2/2011 | Wells | 382/154 |
| 8,116,369 B2* | 2/2012 | Choi et al. | 375/240.01 |
| 2006/0233436 A1* | 10/2006 | Ma et al. | 382/154 |
| 2008/0150945 A1* | 6/2008 | Wang et al. | 345/427 |
| 2008/0228449 A1* | 9/2008 | Birtwistle et al. | 703/1 |
| 2009/0196492 A1* | 8/2009 | Jung et al. | 382/154 |
| 2009/0282369 A1* | 11/2009 | Jones | 715/848 |
| 2011/0050853 A1* | 3/2011 | Zhang et al. | 348/44 |

FOREIGN PATENT DOCUMENTS

| | | |
|---|---|---|
| KR | 10-2008-0052309 A | 6/2008 |
| KR | 1020080052309 A | 6/2008 |
| WO | 2007063478 A2 | 6/2007 |
| WO | WO-2007063478 A2 | 6/2007 |

OTHER PUBLICATIONS

Knorr, S.; Imre, E.; Ozkalayci, B.; Alatan, A.A.; Sikora, T.; , "A Modular Scheme for 2D/3D Conversion of TV Broadcast," 3D Data Processing, Visualization, and Transmission, Third International Symposium on , vol., no., pp. 703-710, Jun. 14-16, 2006.*

Munchurl Kim, J.G. Jeon, J.S. Kwak, M.H. Lee, C. Ahn, "Moving object segmentation in video sequences by user interaction and automatic object tracking", Image and Vision Computing, vol. 19, Issue 5, Apr. 1, 2001, pp. 245-260.*

Yu-Lin Chang; Chih-Ying Fang; Li-Fu Ding; Shao-Yi Chen; Liang-Gee Chen; , "Depth Map Generation for 2D-to-3D Conversion by Short-Term Motion Assisted Color Segmentation," Multimedia and Expo, 2007 IEEE International Conference on , vol., no., pp. 1958-1961, Jul. 2-5, 2007.*

(Continued)

*Primary Examiner* — Bhavesh Mehta
*Assistant Examiner* — Utpal Shah
(74) *Attorney, Agent, or Firm* — Lyon & Harr, LLP; Richard T. Lyon

(57) ABSTRACT

Two-dimensional (2D) video is converted into multi-view video. The 2D video is segmented to generate a temporally consistent segmented 2D video which is made up of a sequence of segmented frames. The multi-view video is generated by employing user-guided operations to generate depth assignments for the segments associated with user-assigned regions of the segmented frames, where a user-assigned region is formed from a group of contiguous segments selected by the user.

18 Claims, 8 Drawing Sheets

OTHER PUBLICATIONS

"Adobe Premiere Pro CS3 User Guide" Apr. 1, 2008 http://www.adobe.com/support/documentation/archived_content/en/premierepro/cs3/premierepro_cs3_help.pdf.*

"PowerDirector 6 User's Guide" by Cybelink 2007 http://download.cyberlink.com/ftpdload/user_guide/powerdirector/6/PowerDirector_UG_Enu.pdf.*

Wu, C., G. Er, X. Xie, T. Li, X. Cao, Q. Dai, A novel method for semi-automatic 2D to 3D video conversion, 3DTV Conf.: The True Vision—Capture, Transmission and Display of 3D Video, May 28-30, 2008, pp. 65-68.

PCT International Search Report, Application No. PCT/US2009/063019, completed Jun. 18, 2010, received Jun. 18, 2010.

"International Search Report", Mailed Jun. 18, 2010, Application No. PCT/US2009/063019, Filed Date Nov. 3, 2009, pp. 1-10.

Wu, et al., "A Novel Method for Semi-automatic 2D to 3D Video Conversion", Retrieved at <<ieeexplore.ieee.org/iel5/4539739/4547776/04547809.pdf>>, in IEEE, 3DTV conference on May 28-30, 2008, pp. 2.

* cited by examiner

CONVERTING 2D VIDEO INTO STEREO VIDEO

BACKGROUND

Most video today is filmed in a two-dimensional (2D) manner and is also presented to a viewer in a 2D manner. Stereo video, which is also referred to as three-dimensional (3D) video, is a particular class of video which provides the viewer with the added illusion of depth (i.e., an added third dimension). Thus, stereo video provides the viewer with a more lifelike viewing experience and an increased sense of reality which allows the viewer to become more engaged in the content of the video.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Video conversion (VC) technique embodiments described herein generally provide for user-guided conversion of a two-dimensional (2D) video into a multi-view video. In one exemplary embodiment a 2D video, which is made up of a sequence of frames, is input first. The inputted frames are then segmented to generate a temporally consistent segmented 2D video which is made up of a sequence of segmented frames. The multi-view video is then generated by employing user-guided operations to generate/establish depth assignments for the segments associated with user-assigned regions of the segmented frames, where a user-assigned region is formed from a group of contiguous segments selected by the user.

In one implementation of the VC technique embodiments described herein the multi-view video is a stereo video having a left view and a right view which are rendered from a user-selected viewpoint.

Various advantages of the VC technique embodiments described herein will become apparent from the Detailed Description which follows hereafter when taken in conjunction with the drawing figures which accompany the Detailed Description.

DESCRIPTION OF THE DRAWINGS

The specific features, aspects, and advantages of the video conversion (VC) technique embodiments described herein will become better understood with regard to the following description, appended claims, and accompanying drawings where:

DETAILED DESCRIPTION

In the following description of video conversion (VC) technique embodiments reference is made to the accompanying drawings which form a part hereof, and in which are shown, by way of illustration, specific embodiments in which the technique can be practiced. It is understood that other embodiments can be utilized and structural changes can be made without departing from the scope of the VC technique embodiments.

The term "2D video" is used herein to refer to a video which is filmed in a two-dimensional (2D) manner. Hence when a 2D video is rendered and viewed it is perceived to have only the dimensions of width and height. As is appreciated in the art of video processing, a video is made up of a sequence of frames, where each frame is made up of an array of pixels. A video also includes one or more scenes where each scene is made up of a "sub-sequence" of frames. The terms "sector" and "field" are used herein to refer to a partitioned area of a computer display device (such as a computer monitor among other things) in which a particular type of graphical user interface (GUI) and/or information (such as video among other things) is displayed, or a particular type of function is performed by a user. The term "clicking" is used herein to refer to a user action of pushing a button on a GUI selection device such as a mouse and the like. The term "right clicking" is used herein to refer to a user action of pushing a first button located on the right side of the GUI selection device. The term "left clicking" is used herein to refer to a user action of pushing a second button located on the left side of the GUI selection device. The term "dragging" is used herein to refer to a user action of moving the GUI selection device while pushing and holding down a particular button on the device. The term "region" is used herein to refer to an area within a video frame formed from a group of contiguous segments.

1.0 Video Conversion

Figure 1:
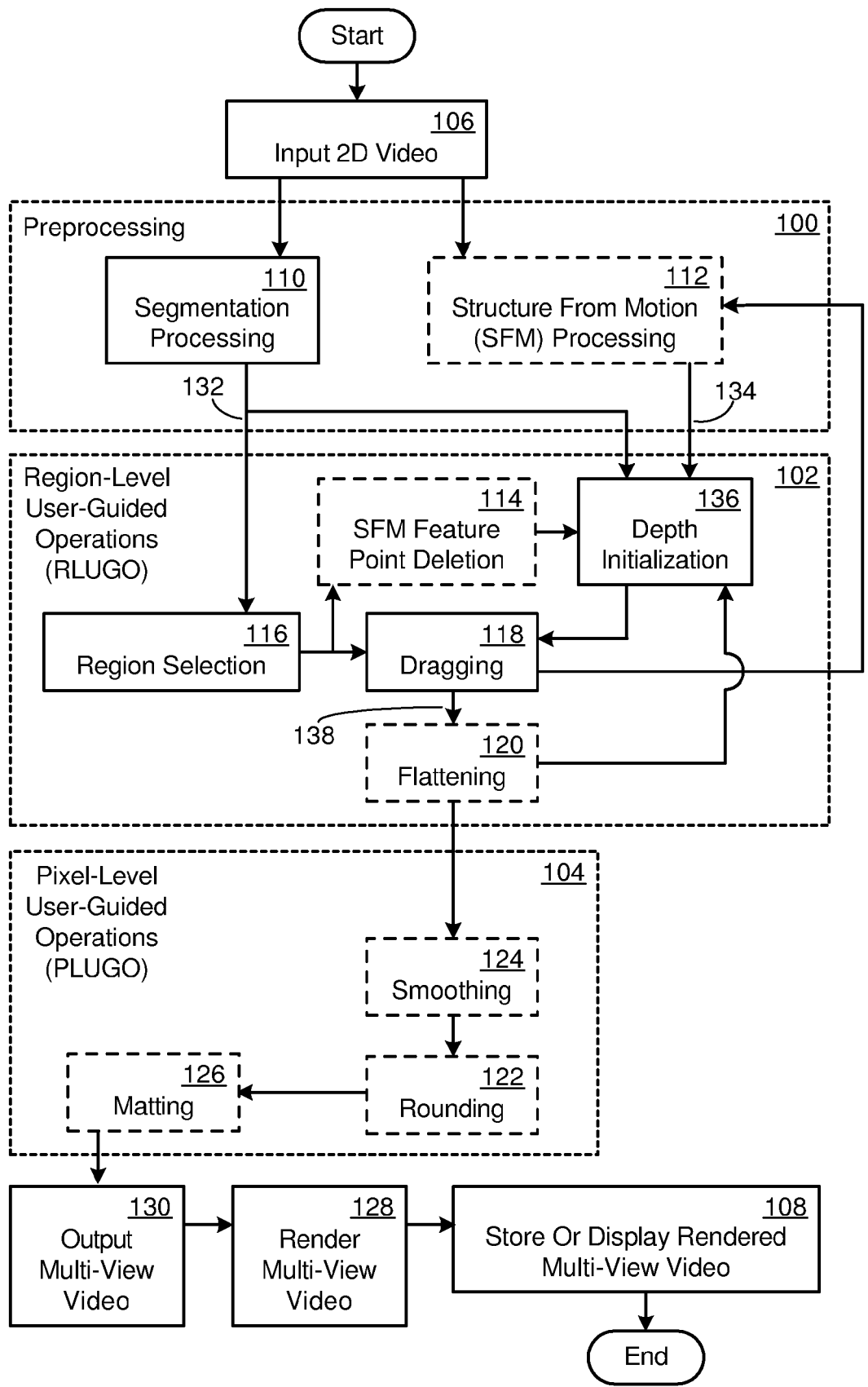
FIG. 1 is a flow diagram illustrating exemplary embodiments, in simplified form, of a user-guided process for converting a two-dimensional (2D) video into a multi-view video.

The VC technique embodiments described herein generally provide for the rapid and efficient conversion of a 2D video into a multi-view video. The term "multi-view video" is used herein to refer to a video that includes sufficient data to provide renderable views of a scene from two or more different viewpoints. FIG. 1 illustrates exemplary embodiments, in simplified form, of a user-guided process for converting a 2D video into a multi-view video.

Referring to FIG. 1, a 2D video 106 is converted into a multi-view video 130 as follows. The 2D video 106 is processed by an automatic preprocessing phase 100 followed by a semi-automatic region-level user-guided operations (RLUGO) phase 102 followed by an optional semi-automatic pixel-level user-guided operations (PLUGO) phase 104, resulting in the generation of a multi-view video 130, which can be subsequently rendered 128, and then stored or displayed 108 to the user. Once the 2D video 106 has been automatically preprocessed 100, the operation of the RLUGO phase 102 and the PLUGO phase 104 are guided by the user as follows. Via intuitive interaction with a GUI, the user performs a variety of automatic video processing procedures and refines the results of these procedures in order to generate the multi-view video 130.

1.1 Converting 2D Video Into Stereo Video

In one particular implementation of the VC technique embodiments described herein the 2D video 106 is converted into a stereo video 130 which is subsequently rendered 128 and then stored or displayed 108. The term "stereo video" is used herein to refer to one particular type of multi-view video 130 having a left view and a right view which are rendered 128 from a user-selected viewpoint, such that when the rendering is displayed 108 it is perceived to have the dimensions of width, height and depth. The remainder of this Detailed Description section describes this particular stereo video implementation. However, as is appreciated in the art of video processing, alternate implementations of the VC technique embodiments are also possible where the 2D video 106 can be converted into a multi-view video 130 having more than two different views which can be subsequently rendered 128 from a variety of user-selected viewpoints.

The VC technique embodiments described herein simplify and automate the process of converting a 2D video into a stereo video. Thus, the VC technique embodiments minimize the cost and time associated with converting a 2D video into a stereo video. The VC technique embodiments are compatible with and operational on 2D videos having a mixture of both dynamic scenes (i.e., scenes having objects that move between frames, herein referred to as "moving objects") and static scenes (i.e., scenes having no moving objects). The VC technique embodiments are also compatible with and operational on 2D videos which are filmed with a mixture of both stationary cameras and moving cameras.

Figure 2:
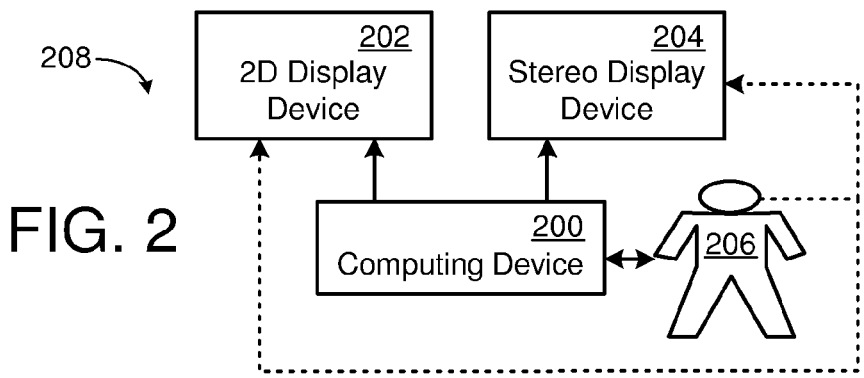
FIG. 2 is a diagram illustrating one embodiment, in simplified form, of a computing environment for the user-guided conversion.

FIG. 2 illustrates one embodiment, in simplified form, of a computing environment 208 for converting a 2D video into a stereo video. As exemplified in FIG. 2 and referring again to FIG. 1, a 2D display device 202 and a stereo display device 204 are independently attached to a computing device 200. The computing device 200 utilizes the 2D display device 202 to display a rendering of the GUI to the user 206. The computing device 200 utilizes the stereo display device 204 to display the rendered stereo video 108 to the user 206. Any conventional 2D computer monitor or other type of 2D display having a size and pixel resolution suitable for displaying video can be employed for the 2D display device 202. The computing device 200 is utilized to perform the processing associated with the preprocessing phase 100. The user 206 then utilizes the computing device 200, 2D display device 202 and the rendering of the GUI displayed thereon to perform the processing and related user-guided operations associated with the RLUGO phase 102 and the PLUGO phase 104. Once these three phases 100/102/104 have been completed and the 2D video 106 has been converted to a stereo video 130, the computing device 200 can render the stereo video 128, and then store the rendered stereo video or display it 108 to the user 206 on the stereo display device 204. Alternately, the computing device 200 can store the stereo video 130, and then render and display it at a later time.

Referring again to FIGS. 1 and 2, in tested embodiments of the VC technique described herein, the stereo video 130 was rendered 128 to textures by rendering it as a triangular mesh with one vertex per pixel, and a conventional 3D computer monitor was employed for the stereo display device 204. Whenever a 3D computer monitor is not available, an alternate embodiment of the VC technique is possible where a second 2D display device is employed for the stereo display device 204. In this case, the stereo video 130 would be rendered 128 in anaglyph format, the rendered stereo video would be displayed 108 on the second 2D display device, and the user 206 would wear a pair of conventional two-color anaglyph glasses (not shown) to view the stereo video on the second 2D display device. Another alternate embodiment of the VC technique is also possible where the left view and right view of the rendered stereo video 128 are displayed 108 side-by-side on the second 2D display device. In this case, the user 206 would employ a lorgnette or a stereoscope to view the stereo video on the second 2D display device.

1.2 Preprocessing

Referring again to FIG. 1, this section describes exemplary implementations of the automatic preprocessing phase 100 of the VC technique embodiments described herein. The preprocessing phase 100 generally includes an automatic segmentation processing stage 110 and an optional automatic structure from motion (SFM) processing stage 112 whose operation will now be described.

Generally speaking and as is appreciated in the art of video processing, converting a 2D video 106 into a stereo video 130 requires that an appropriate depth value (hereafter simply referred to as a "depth") be assigned to the pixels of each frame in the 2D video. Inside of regions corresponding to distinct objects in a particular scene, the pixel depths tend to vary smoothly within each frame and over time (i.e., across successive frames). However, at the boundaries between such regions the pixel depths may be discontinuous. The VC technique embodiments described herein address these depth discontinuities, and isolate the regions of frames in the 2D video 106 that correspond to distinct objects, by performing segmentation processing 110 on each frame of the 2D video 106. The segmentation processing stage 110 automatically generates a temporally consistent segmented 2D video 132 which is input to the RLUGO phase 102. As is appreciated in the art of image segmentation processing, each segmented frame in the segmented 2D video 132 includes a plurality of segments and a plurality of regions, where each segment encompasses one or more pixels and each region is formed from a group of contiguous segments.

Referring again to FIG. 1, in tested embodiments of the VC technique a known temporally consistent segmentation (TCS) method was employed for the segmentation processing 110 stage. The TCS method utilized segment sizes which were sufficiently small enough to preserve meaningful structural information in each frame in the 2D video 106. In other words, the segments sizes were sufficiently small enough so as to minimize the segments in each segmented frame having pixels belonging to two different objects. As is appreciated in the art of video processing, a TCS method typically estimates bidirectional motion based on spatial coherence and similarity of segment colors. The TCS method also integrates matting to account for mixed color pixels (i.e., the TCS method extracts foreground and background colors for the pixels of each frame in the 2D video 106). The TCS method generates a large set of segments for each frame, where each segment has a link to the corresponding segment in the next segmented frame and previous segmented frame in the sequence. The segmentation produced by the TCS method results in corresponding segments across one or more segmented frames that have similar shapes and colors, and segment boundaries that are generally similar across the one or more segmented frames. Since the TCS method operates on pixel clusters as opposed to operating on individual pixels, the time associated with completing the segmentation processing 110 is significantly reduced.

Generally speaking and referring again to FIG. 1, the preprocessing phase 100 can optionally perform SFM processing 112 on the 2D video 106 in order to partially automate pixel depth assignments for particular scenes in the 2D video which were filmed with a moving camera. The SFM processing stage 112 automatically recovers a set of feature points and camera parameters for each frame in such scenes. Each feature point specifies a 3D position, a color, and a list of correspondences which specify the particular frames in which the feature point is visible. The SFM processing stage 112 generates SFM results 134 which are input to the RLUGO phase 102 and include the recovered feature points and camera parameters. The way in which the feature points and camera parameters are utilized to partially automate pixel depth assignments is described in more detail hereafter.

1.3 Graphical User Interface (GUI)

Referring again to FIGS. 1 and 2, this section describes the GUI which the user 206 utilizes to guide the operation of the RLUGO phase 102 and the optional PLUGO phase 104 of the VC technique embodiments described herein. A rendering of the GUI is displayed to the user 206 on the 2D display device 202. As is described in more detail hereafter, the user 206 enters commands into the computing device 200 via a GUI selection device (not shown) such as a mouse and the like.

Figure 3:
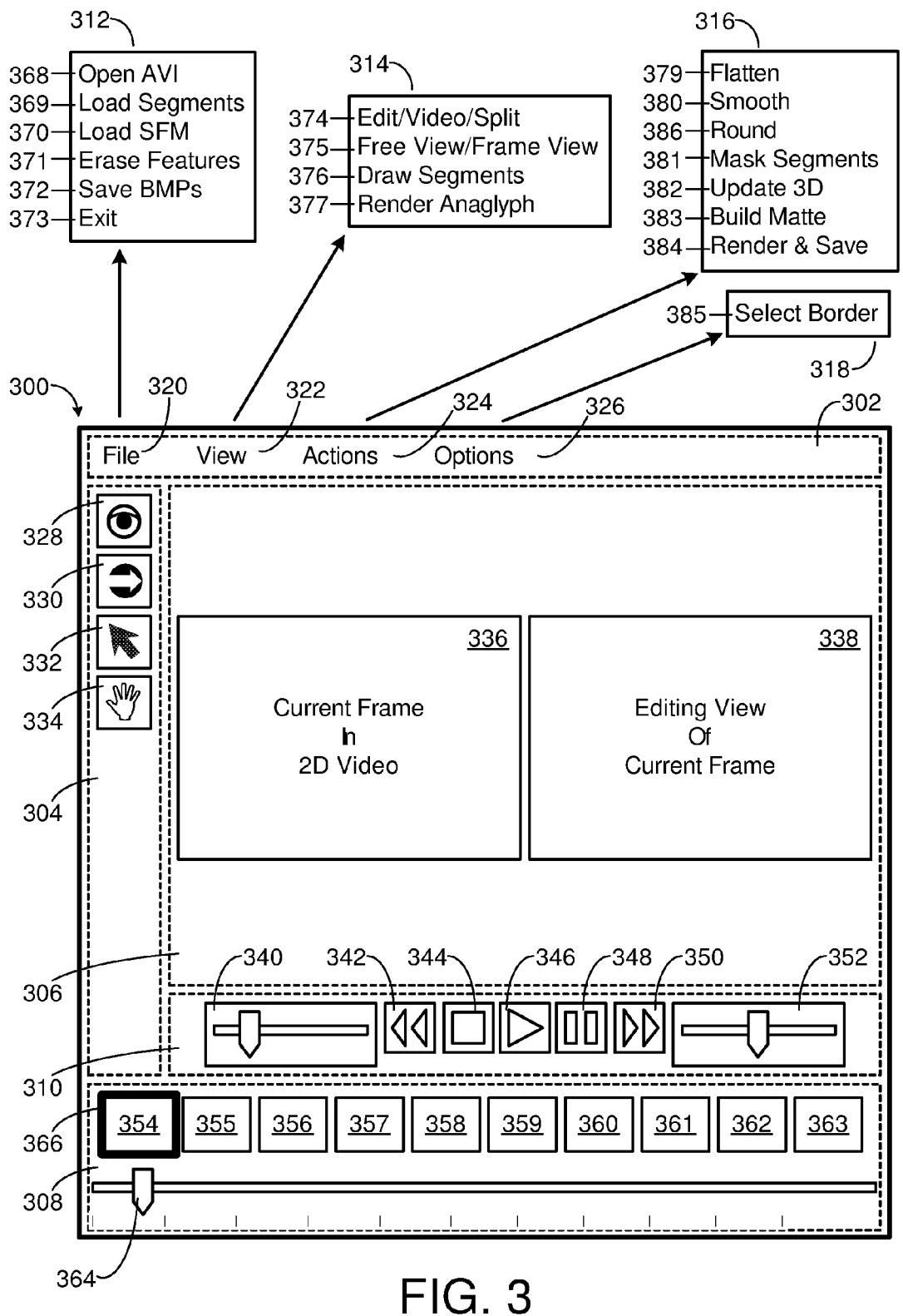
FIG. 3 is a diagram illustrating an exemplary embodiment, in simplified form, of a layout of a graphical user interface (GUI) for the user-guided conversion.

FIG. 3 illustrates an exemplary embodiment, in simplified form, of a layout of the GUI. As exemplified in FIG. 3, the GUI includes a conversion control sector (CCS) 300 within which are included at least the following sub-sectors: a menu sub-sector 302, a tools sub-sector 304, a viewing sub-sector 306, a timeline control sub-sector 308 and a playback control sub-sector 310. The operation of each of these sub-sectors and their related GUI-based user controls will now be described in more detail.

Referring again to FIG. 3, the viewing sub-sector 306 can be configured by the user to have two viewing fields 336 and 338 where a current frame in the 2D video is displayed in one of the viewing fields 336 and an editing view of the current frame is displayed in the other viewing field 338. The editing view 338 depicts the 3D structure of the scene included within the current frame 336 from a user-selected viewpoint. This allows the user to view the depths assigned to particular regions of the scene. A pair of virtual cameras is employed in the rendering of the stereo video. The position and orientation of each virtual camera in the pair of virtual cameras (i.e., the disparity between the left and right views of the rendered stereo video) are selected by the user, and are correspondingly displayed to the user, via user-adjustable slider controls. More particularly, a leftmost slider control element 340 included in the playback control sub-sector 310 is utilized by the user to adjust the horizontal separation between the pair of virtual cameras. A rightmost slider control element 352 also included in the playback control sub-sector 310 is utilized by the user to adjust the distance of the pair of virtual cameras from the scene. It is noted that a change to this distance also results in a focal length modification in order to maintain a viewing angle that keeps the whole scene in view. The user can view the result of their changes to the virtual camera settings in the following two different ways. Changes to the virtual camera settings are immediately displayed in the editing view of the current frame 338 whenever the editing view of the current frame is displayed in the viewing sub-sector 306, and are also displayed when the user views the rendered stereo video on the stereo display device.

Referring again to FIG. 3, the viewing sub-sector 306 can also be configured by the user to have a single viewing field (not shown) in which either the current frame in the 2D video 336 is displayed or the editing view of the current frame 338 is displayed. The manner by which the user configures the viewing sub-sector 306 is described hereafter.

Referring again to FIG. 3, the timeline control sub-sector 308 generally provides the user with the ability to navigate through the entire sequence of frames which make up the 2D video, and to select any frame in the sequence for viewing and editing. More particularly, the timeline control sub-sector 308 includes a user-adjustable timeline slider control element 364 via which the user can navigate to any point in time in the 2D video from the beginning (the leftmost end of the slider) to the end (the rightmost end of the slider). The timeline control sub-sector 308 also includes a thumbnail representation of a limited sequence of frames 354-363 in the 2D video. The first frame 354 in the limited sequence 354-363 is the frame in the 2D video corresponding to the particular point in time navigated to by the timeline slider control element 364. Subsequent frames 355-363 in the limited sequence 354-363 are the frames in the 2D video that immediately follow the first frame. The first frame 354 in the limited sequence 354-363 is automatically displayed in the viewing sub-sector 306. The user can then select any of the other frames in the limited sequence 355-363 and the selected frame will be displayed in the viewing sub-sector 306.

Referring again to FIG. 3, upon the user adjusting the timeline slider control element 364 to a new point in time, the limited sequence of frames 354-363 is automatically updated based on the new point in time. The first frame 354 in the new limited sequence 354-363 is automatically displayed in the viewing sub-sector 306. The user can then select any of the other frames in the new limited sequence 355-363 and the selected frame will be displayed in the viewing sub-sector 306. The particular frame in the limited sequence 354-363 that is being displayed in the viewing sub-sector 306 is highlighted via a border 366 around the frame.

Referring again to FIGS. 1 and 3, the tools sub-sector 304 includes a user-selectable Rotate Camera icon 328, Translate Camera icon 330, Select Regions icon 332 and Drag icon 334. User selection of each of these icons 328/330/332/334 provides the user with a particular tool which is utilized by the user in the RLUGO phase 102 and/or the PLUGO phase 104 of the VC technique embodiments described herein. The operation of these tools is described in more detail hereafter. Generally speaking however, when the viewing sub-sector 306 is configured to display the editing view of the current frame 338 the user can perform the following user-guided operations. The user can rotate the camera used to render the editing view of the current frame 338 around the scene included within the current frame, zoom in on the scene and zoom out from the scene by selecting the Rotate Camera icon 328. The user can translate this camera in the image plane and zoom by selecting the Translate Camera icon 330. The user can mark-out one or more regions of interest to be selected during a region selection stage 116 (described in more detail hereafter) of the RLUGO phase 102 by selecting the Select Regions icon 332. The user can perform a variety of "dragging" operations to refine depths for user-selected regions by selecting the Drag icon 334. The user performs these dragging operations during a dragging stage 118 of the RLUGO phase 102 which is described in more detail hereafter.

Referring again to FIGS. 1 and 3, the menu sub-sector 302 includes a user-selectable File menu item 320, View menu item 322, Actions menu item 324 and Options menu item 326. Upon the user's selection of the File menu item 320 a scrollable File pop-up sector 312 is displayed which provides the user with the following user-selectable items. The user can load a particular 2D video 106 to work on by scrolling through the File pop-up sector 312 to the Open AVI item 368 and selecting it. The user can load the segmented 2D video 132 generated from the particular 2D video 106 in the segmentation processing stage 110 by scrolling through the File pop-up sector 312 to the Load Segments item 369 and selecting it. The user can load the SFM results 134 which include the feature points and camera parameters recovered from the 2D video 106 in the SFM processing stage 112 by scrolling through the File pop-up sector 312 to the Load SFM item 370 and selecting it. The user can delete feature points for segments which have been masked by scrolling through the File pop-up sector 312 to the Erase Features item 371 and selecting it. The way in which the user masks segments is described in more detail hereafter. The user can render 128 the left view and right view of the stereo video 130 as separate bitmaps by scrolling through the File pop-up sector 312 to the Save BMPs item 372 and selecting it. The user can exit the GUI by scrolling through the File pop-up sector 312 to the Exit item 373 and selecting it.

Referring again to FIGS. 1 and 3, upon the user's selection of the View menu item 322 a scrollable View pop-up sector 314 is displayed which provides the user with the following user-selectable items. The user can configure the viewing sub-sector 306 as follows by scrolling through the View pop-up sector 314 to the Edit/View/Split item 374 and selecting it. The viewing sub-sector 306 can be configured such that either both the current frame in the 2D video 336 and an editing view of the current frame 338 are displayed (Split), or only the current frame in the 2D video 336 is displayed (Video), or only the editing view of the current frame 338 is displayed (Edit) as described heretofore. The user can choose between a "Free View" perspective and a "Frame View" perspective of what is displayed in the editing view of the current frame 338 by scrolling through the View pop-up sector 314 to the Free View/Frame View item 375 and selecting it. In the Free View perspective pixel depths are rendered and the user is able to rotate their viewing perspective around the scene included within the current frame 336. In the Frame View perspective the scene is rendered from a front-on perspective with no depth (i.e., the scene is rendered in 2D). The user can show the segmentation for what is displayed in the editing view of the current frame 338 (which has been previously generated in the segmentation processing stage 110 described heretofore) by scrolling through the View pop-up sector 314 to the Draw Segments item 376 and selecting it. This results in each segment being rendered with a random color thus making the segmentation viewable by the user. The user can choose to render the stereo video 128 in anaglyph format by scrolling through the View pop-up sector 314 to the Render Anaglyph item 377 and selecting it.

Figure 5:
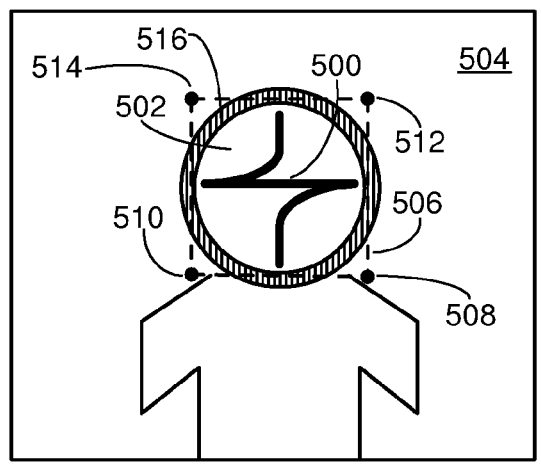
FIG. 5 is a diagram illustrating an exemplary embodiment, in simplified form, of a rough mark-out of a region of interest in a video frame and a user-selectable border around the region of interest.

Referring again to FIG. 3, upon the user's selection of the Options menu item 326 an Options pop-up sector 318 is displayed which provides the user with a Select Border option 385 among other options. By selecting the Select Border option 385 the user can optionally select a border around user-selected 332 regions such that when the user updates the stereo video as described hereafter segments belonging to the border will be assigned new depths, while segments not belonging to the border will not be assigned new depths (i.e., the depths of segments not belonging to the border will remain fixed at their current values when the user updates the stereo video). The user can subsequently de-select such a selected border by again selecting the Select Border option 385. FIG. 5 illustrates an exemplary embodiment, in simplified form, of a user-selectable border 516 around a user-selected region of interest 502. The Select Border option 385 is particularly useful when the user assigns depths to adjacent regions. By way of example but not limitation, when the user selects a region of interest in the current frame the selected region may include segments belonging to a neighboring region. In this case, when the user refines the segment depths for such a selected region via the dragging operations described herein, the dragging refinements will be added to any depths that already exist for these segments. Additionally, the selected region may not include segments which also weren't included in a neighboring selected region. In this case, some segments along the boundary between the selected region and the neighboring selected region may remain fixed at the default depth. By employing the Select Border option 385 segments within an expanded boundary around the selected region will be assigned depths within the range spanned by nearby segments when the user updates the stereo video.

Referring again to FIGS. 1 and 3, upon the user's selection of the Actions menu item 324 a scrollable Actions pop-up sector 316 is displayed which provides the user with the following user-selectable items. The user can flatten regions of interest which have been selected 332 by scrolling through the Actions pop-up sector 316 to the Flatten item 379 and selecting it. The user performs this flattening operation during an optional flattening stage 120 of the RLUGO phase 102 which is described in more detail hereafter. The user can smooth the depths within regions of interest which have been selected 332 by scrolling through the Actions pop-up sector 316 to the Smooth item 380 and selecting it. The user performs this smoothing operation during an optional smoothing stage 124 of the PLUGO phase 104 which is described in more detail hereafter. The user can round regions of interest which have been selected 332 by scrolling through the Actions pop-up sector 316 to the Round item 386 and selecting it. The user performs this rounding operation during an optional rounding stage 122 of the PLUGO phase 104 which is described in more detail hereafter. In the case where the aforementioned optional SFM processing 112 was performed on the 2D video 106, the user can mask segments within regions of interest which have been selected 332 by scrolling through the Actions pop-up sector 316 to the Mask Segments item 381 and selecting it. The user performs this segment masking operation during an optional SFM feature point deletion stage 114 of the RLUGO phase 102 which is described in more detail hereafter. The user can update the stereo video 130 with the results of the various user-guided operations they perform during the RLUGO phase 102 and PLUGO 104 by scrolling through the Actions pop-up sector 316 to the Update 3D item 382 and selecting it, upon which a graph cut will be performed with the latest depth assignments. In order to enhance the stereo video 130 the user can perform a matting operation on regions of interest which have been selected 332 by scrolling through the Actions pop-up sector 316 to the Build Matte item 383 and selecting it. The user performs this matting operation during an optional final matting stage 126 of the PLUGO phase 104 which is described in more detail hereafter.

Referring again to FIGS. 1-3, once the various stages of the preprocessing phase 100, RLUGO phase 102 and PLUGO phase 104 have been completed so that the 2D video 106 has been converted into a stereo video 130, the user can render 128 the stereo video to textures by scrolling through the Actions pop-up sector 316 to the Render & Save item 384 and selecting it. A copy of the rendered stereo video 128 is saved in storage on the computing device 200 for fast playback.

Referring again to FIGS. 1-3, the playback control sub-sector 310 also includes the following user-selectable icons which are utilized by the user 206 to playback the rendered stereo video 108 on the stereo display device 204 for viewing by the user. User selection of a play icon 346 initiates playback of the rendered stereo video 108 on the stereo display device 204. User selection of a stop icon 344 ceases the playback. User selection of a pause icon 348 temporarily pauses the playback. User selection of a fast-forward icon 350 initiates a fast-forwarding of the playback. User selection of a rewind icon 342 initiates a rewinding of the playback.

1.4 Region-Level User-Guided Operations (RLUGO)

Referring again to FIGS. 1 and 3, this section describes exemplary implementations of the RLUGO phase 102 of the VC technique embodiments described herein. Generally speaking, during the RLUGO phase 102 the user interacts with the GUI's CCS 300 to generate a first-pass stereo video 138 by generating depth assignments for the segments associated with each region of the frames in the segmented 2D video 132. During this user interaction the user marks-out one or more regions of interest in particular frames in the segmented 2D video 132 in order to select the regions. The user then manually refines the depths that were initially assigned to each segment of the user-selected regions, resulting in the assignment of coarse depths to all of the pixels of each frame. The RLUGO phase 102 includes a region selection stage 116 and a depth initialization stage 136, followed by a dragging stage 118 and an optional flattening stage 120. In the case where the preprocessing phase 100 includes the optional SFM processing stage 112 as described heretofore, the RLUGO phase 102 will also include an SFM feature point deletion stage 114. The operation of each of these stages 116/136/118/120/114 will now be described in more detail.

1.4.1 Region Selection

Figure 4:
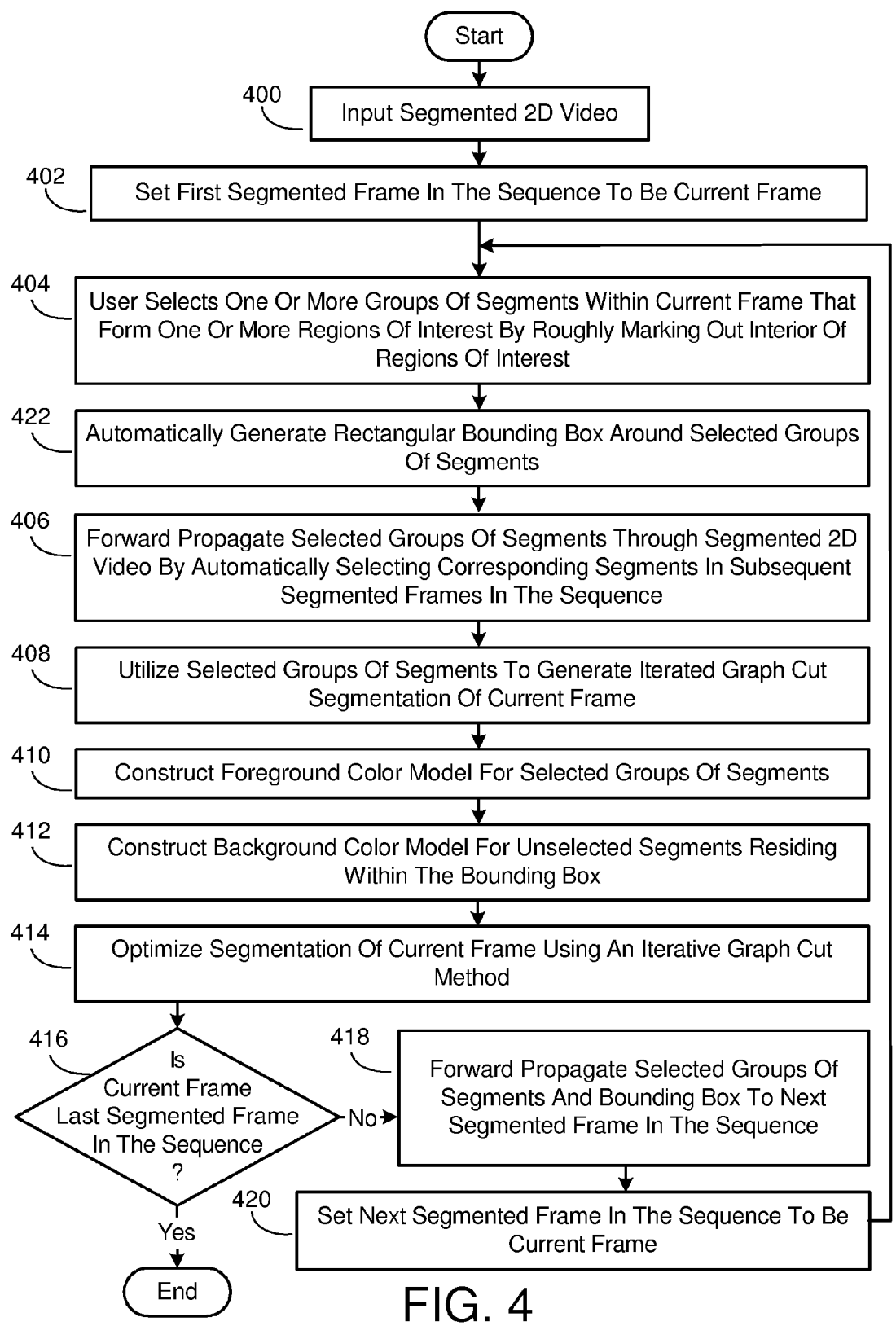
FIG. 4 is a flow diagram illustrating an exemplary embodiment of a process associated with a region selection stage of the user-guided conversion.

FIG. 4 illustrates an exemplary implementation of a semi-automatic process associated with the region selection stage of the VC technique embodiments described herein. As exemplified in FIG. 4, the process starts with inputting the segmented 2D video generated by the segmentation processing stage 400, where the segmented 2D video is made up of a sequence of segmented frames. The first segmented frame in the sequence is then set to be the current frame 402. The user then selects one or more groups of segments within the current frame that form one or more regions of interest by roughly marking-out the interior of the regions of interest 404. FIG. 5 illustrates an exemplary embodiment, in simplified form, of a rough mark-out 500 of a region of interest 502 in a video frame 504.

Referring again to FIG. 4, after the user has selected the one or more groups of segments within the current frame that form the one or more regions of interest 404, a rectangular bounding box is automatically generated around the selected groups of segments 422. FIG. 5 illustrates an exemplary embodiment, in simplified form, of a rectangular bounding box 506 around a selected group of segments that form a region of interest 502. The selected groups of segments are then forward propagated through the segmented 2D video by automatically selecting corresponding segments in subsequent segmented frames in the sequence 406. The selected groups of segments are then utilized to generate an iterated graph cut segmentation of the current frame 408. A foreground color model is then constructed for the selected groups of segments 410 and a background color model is constructed for unselected segments residing within the bounding box 412.

Referring again to FIG. 4, after the foreground and background color models have been constructed 410/412, the segmentation of the current frame is optimized using an iterative graph cut method 414 resulting in an optimized segmentation for the current frame, where the selected groups of segments are constrained as foreground and segments outside the bounding box are constrained as background, and iterations of the graph cut continue until convergence. In tested embodiments of the VC technique embodiments described herein, an interactive foreground extraction technique was employed for the iterative graph cut method. Whenever the current frame is not the last segmented frame in the sequence 416, the selected groups of segments and the bounding box around the optimized segmentation in the current frame are forward propagated to the next segmented frame in the sequence 418, where particular segments are prevented from being propagated if they don't fit the foreground and background color models. The current frame is then set to the next segmented frame in the sequence 420 and process actions 404, 422, 406, 408, 410, 412, 414, 416, 418 and 420 are repeated again. This cycle continues until the current frame is the last segmented frame in the sequence 416 at which time the process ends. It is noted that the segmentation of the current frame can be optionally refined by the user as follows. The user can add foreground and background samples to the current frame via positive and negative strokes respectively. More particularly, positive strokes can be drawn on the foreground to specify foreground samples while negative strokes can be drawn on the background to specify background samples.

1.4.2 Depth Initialization

Referring again to FIG. 1, this section describes exemplary implementations of the depth initialization stage 136 of the VC technique embodiments described herein. Generally speaking, the depth initialization stage 136 operates to initialize the segment depths for the segmented frames in the segmented 2D video 132. For each particular scene in the segmented 2D video 132, the way in which the depth initialization stage 136 operates depends on whether or not the scene was filmed with a moving camera and whether or not the optional SFM processing 112 was performed on the 2D video 106.

Generally speaking and referring again to FIG. 1, in the case where a particular scene in the 2D video 106 was filmed with a moving camera and SFM processing 112 was performed on the 2D video to generate SFM results 134, the SFM results will be processed by the depth initialization stage 136 in order to initialize the segment depths for the sub-sequence of segmented frames that make up the scene. Although the feature points that were recovered for each frame in the scene could be utilized to set the segment depths directly, this is not desirable since the feature points are typically far sparser than the segments; therefore, depths would need to be inferred for segments that have no corresponding feature point. Rather, the depth initialization stage 136 utilizes the SFM results 134 to set segments to depths that are probable given the recovered feature points while encouraging the depth discontinuities to follow the image discontinuities. This task is formulated as a maximum a posteriori (MAP) estimation of a Markov Random Field (MRF) model. The MAP solution is found using a volumetric graph cut procedure which will now be described in more detail.

Figure 6:
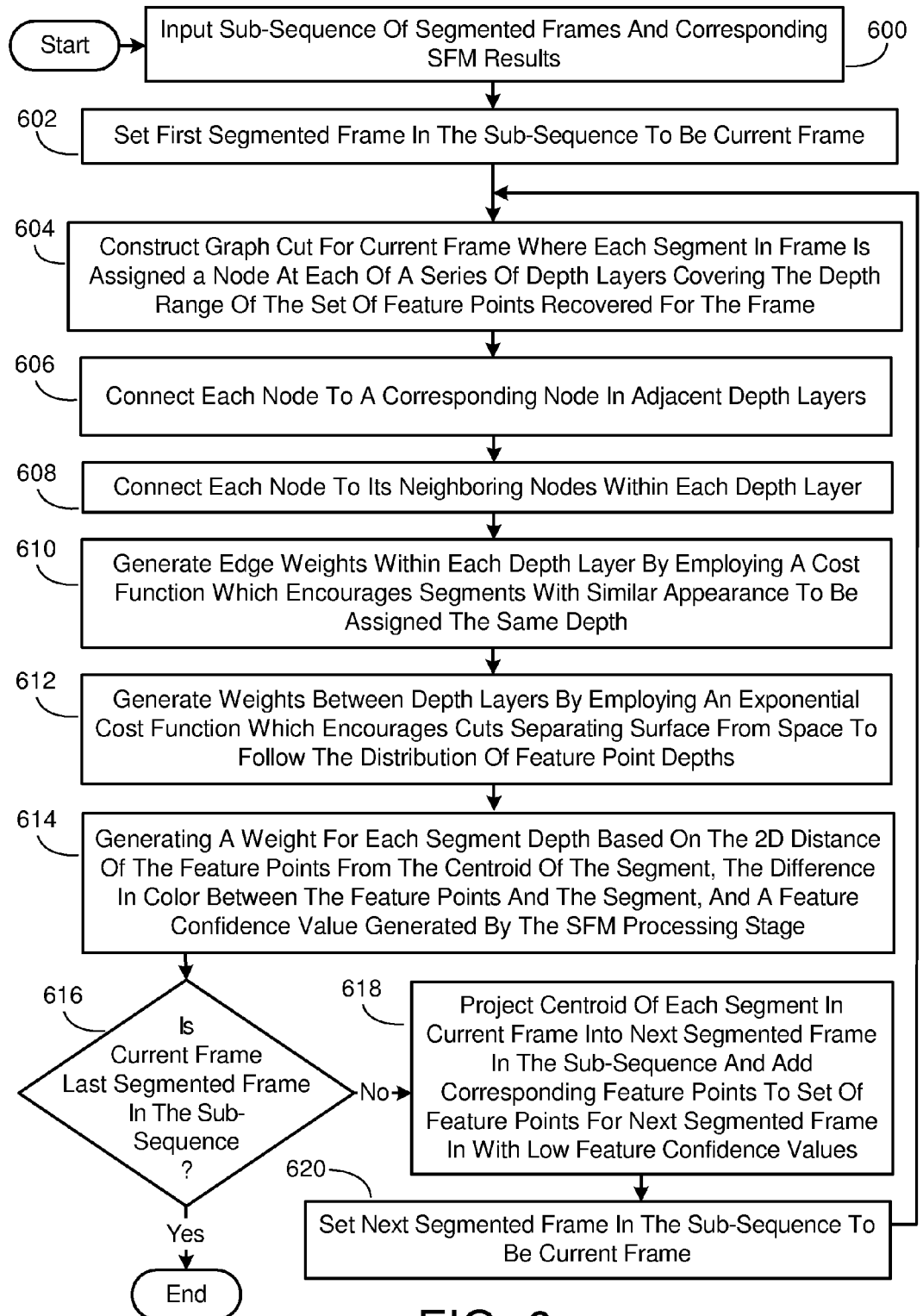
FIG. 6 is a flow diagram illustrating one embodiment of a process associated with a depth initialization stage of the user-guided conversion.

FIG. 6 illustrates one implementation of an automatic process associated with the depth initialization stage of the VC technique embodiments described herein. This embodiment is employed to initialize the segment depths for the sub-sequence of segmented frames that make up particular scenes in the segmented 2D video which were filmed with a moving camera and which were processed by the SFM processing stage. As exemplified in FIG. 6, the process starts with inputting the sub-sequence of segmented frames that make up such a scene and the corresponding SFM results generated by the SFM processing stage 600. The first segmented frame in the sub-sequence is then set to be the current frame 602. A graph cut is then constructed for the current frame where each segment in the current frame is assigned a node at each of a series of depth layers covering the depth range of the set of feature points that were recovered for the current frame 604. Each node is then connected to a corresponding node in adjacent depth layers 606, and is also connected to its neighboring nodes within each depth layer 608. Edge weights are then generated within each depth layer by employing a cost function which encourages segments with similar appearance to be assigned the same depth 610, where the cost function can be the same as that which was used in the segmentation processing stage. Weights are then generated between the depth layers by employing an exponential cost function which encourages cuts separating surface from space to follow the distribution of feature point depths 612, where for each span of nodes corresponding to a segment, the exponential cost function penalizes the distance of the segment depth set by a cut from a weighted mean of depths for feature points within a prescribed window around the centroid of the segment.

Referring again to FIG. 6, after weights have been generated between the depth layers 612, a weight is generated for each segment depth based on the 2D distance of the feature points from the centroid of the segment, the difference in color between the feature points and the segment, and a feature confidence value which is generated by the SFM processing stage 614. A variance term is also employed in this segment depth weight generation 614 which reduces the cost of cuts which are far from the weighted mean of depths for feature points within the prescribed window around the centroid of the segment if the spread of depths in the window is wide or the sum of feature point weights is low (i.e., if few feature points are found in the window, the feature points are far from the segment, or the colors of the feature points poorly correspond with the segment color). Whenever the current frame is not the last segmented frame in the sub-sequence 616, the centroid of each segment in the current frame is projected into the next segmented frame in the sub-sequence and the corresponding feature points are added to the set of feature points for the next segmented frame with low feature confidence values 618 in order to encourage temporal consistency between successive segmented frames in the sub-sequence, and in order to avoid the accumulation of errors over the sub-sequence. The next segmented frame in the sub-sequence is then set to be the current frame 620 and process actions 604, 606, 608, 610, 612, 614, 616, 618 and 620 are repeated again. This cycle continues until the current frame is the last frame in the sequence 616 at which time the process ends.

Generally speaking, for particular scenes in the segmented 2D video where no SFM results are available (i.e., for particular scenes that were filmed with a stationary camera and/ or for dynamic scenes) the segment depths for the sub-sequence of segmented frames that make up such scenes can be initialized as follows. All the segments in each segmented frame in the sub-sequence are initially assigned a feature point having a prescribed common depth and a low feature confidence value. The set of feature points and depths for the segments in the sub-sequence of segmented frames are then refined via user-guided operations in the dragging stage 118, and in the subsequent optional flattening stage 120, smoothing stage 124, rounding stage 122 and matting stage 126 each of which are described in more detail hereafter.

1.4.3 Dragging

Referring again to FIGS. 1 and 5, this section describes exemplary implementations of the dragging stage 118 of the VC technique embodiments described herein. In the dragging stage 118 the user performs a dragging operation to refine the segment depths for segments in one or more user-selected regions 502 of the current frame 504. This dragging operation operates as follows.

Generally speaking and referring again to FIG. 5, the user refines the segment depths for segments in the user selected regions 502 by setting a position and orientation of a plane onto which all segments in the regions are then projected. More particularly, a handle 508/510/512/514 resides at each corner of the bounding box 506 around the user-selected regions 502. The user can move the position of the plane along a central z-axis (i.e., move the entire plane along the z-axis) by clicking and dragging within the user-selected regions. The user can change the orientation of the plane around the z-axis by clicking and dragging one or more of the handles as follows. Clicking and dragging a single handle residing on a particular corner (e.g., 508) of the bounding box 506 changes the plane's orientation around the z-axis by moving the particular corner's position along the z-axis while the position of the corner opposite the particular corner (e.g., 514) remains fixed. Clicking and dragging two adjacent handles residing on a particular edge (e.g., 508 and 510) of the bounding box 506 changes the plane's orientation along the z-axis by moving the particular edge's position along the z-axis while the position of the edge opposite the particular edge (e.g., 512 and 514) remains fixed.

Referring again to FIGS. 1 and 5, for user-selected regions 502 having no moving objects (i.e., none of the regions' objects move in the corresponding scene), right-clicking and dragging will apply changes made to the plane's position and orientation in the current frame 504 to all subsequent segmented frames in the segmented 2D video in which the regions 502 have been selected by the user. For user-selected regions 502 having one or more moving objects (i.e., one or more of the regions' objects move in the corresponding scene), left-clicking and dragging will change the plane's position and orientation in the current frame 504, and then the changes will be interpolated for segmented frames between the current frame and the next segmented frame in the sequence in which refinement of the segment depths for the user-selected regions have also been made by the user. If the user-selected regions 502 have multiple depths, depth offsets from the plane are maintained throughout the dragging operation. A global depth offset can be adjusted by clicking to select the whole video mesh and then dragging the selected mesh. The whole video mesh is selected by clicking on the current frame 504 and then releasing without moving the GUI selection device. Adjusting the global depth offset allows the user to control how recessed into the screen the background will appear when the stereo video 130 is rendered 128 and viewed.

Referring again to FIGS. 5 and 6, the dragging operation can be utilized to update the SFM results for the current frame by manually adjusting the depth of particular segments for which high weights are generated (action 614 of the depth initialization stage) in order to force the particular segment depths to be observed in the result of the iterative graph cut procedure of the depth initialization stage. This manual adjustment of the depth of particular segments results in replacing any feature points for the particular segments that previously existed in the set of feature points with new feature points for any affected frames, where the affected frames are frames in which the new feature points lie (i.e., are part of). By including these new feature points in the set of feature points, the adjusted segment depths will be utilized by the depth cost function of nearby segments, thus propagating the adjusted segment depths through the frame. In the case where the user selects the aforementioned border 516 around the user-selected regions 502, feature points will be replaced and segment depths will be adjusted only for segments whose centroid resides within the interior of the border, thus reducing the accuracy needed in selecting the dragged region. Once the adjusted depths have been assigned to the particular segments, any edge weights which were added to the particular segments are removed.

1.4.4 Flattening

Referring again to FIGS. 1, 3 and 5, this section describes an exemplary implementation of the optional flattening stage 120 of the VC technique embodiments described herein. Generally speaking, the flattening stage 120 operates to remove discontinuities between disjoint segments in the current frame 504 that should have the same depth. More particularly, once the user has refined the segment depths for the segments within the one or more user-selected regions 502 of the current frame 504 in the dragging stage 118, the user can flatten the regions by selecting the aforementioned Flatten item 379 in the Actions pop-up sector 316 of the GUI's CCS 300. This results in high edge weights being generated for edges between the segments within the regions 502, thus encouraging the aforementioned graph cut procedure in the depth initialization stage 136 to assign consistent segment depths for these segments. The segments within the regions 502 are then forward propagated through subsequent segmented frames in the sequence.

1.4.5 Deleting SFM Feature Points

Referring again to FIG. 1, this section describes an exemplary implementation of the optional SFM feature point deletion stage 114 of the VC technique embodiments described herein. In particular scenes of the video which are highly dynamic (i.e., scenes which include one or more substantially moving objects), the SFM processing stage 112 can have difficulty distinguishing between motion due to camera movement and motion due to moving objects. To address this situation and optimize the 2D to 3D conversion, the user can perform the aforementioned segment masking operation as follows.

Figure 10:
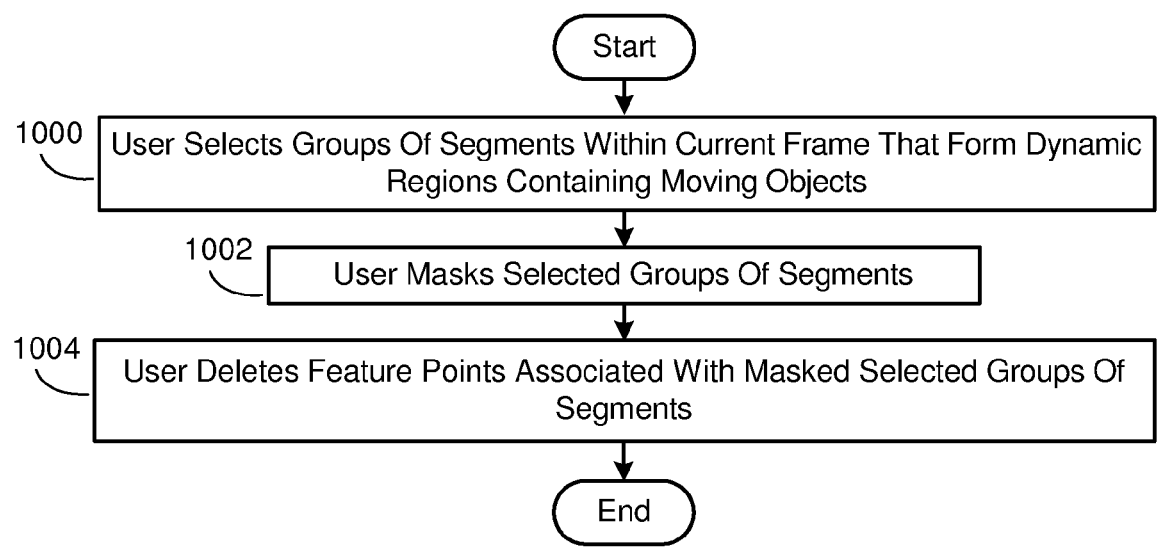
FIG. 10 is a flow diagram illustrating an exemplary embodiment of a process associated with an optional structure from motion feature point deletion stage of the user-guided conversion.

FIG. 10 illustrates an exemplary embodiment of a user-guided process associated with the optional SFM feature point deletion stage of the VC technique embodiments described herein. As exemplified in FIG. 10 and referring again to FIGS. 1 and 3, the process starts with the user selecting one or more regions of the current frame that include one or more moving objects, hereafter referred to as dynamic regions 1000. The user then masks the segments within the user-selected dynamic regions 1002 by selecting the aforementioned Mask Segments item 381 in the Actions pop-up sector 316 of the GUI's CCS 300. Finally, the user deletes the feature points associated with the masked segments 1004 by selecting the aforementioned Erase Features item 371 in the File pop-up sector 312, thus excluding the deleted feature points from the depth initialization 136.

It is noted that although the SFM feature point deletion stage 114 enhances the recovery of camera parameters, it results in there being no feature points for the masked dynamic regions. In order to address this situation, or in the event that the feature points recovered during the SFM processing stage 112 are sparse or noisy, the region-level user-guided operations associated with the region selection 116, dragging 118 and flattening 120 stages described heretofore, and the pixel-level user-guided operations associated with the optional smoothing 124, rounding 122 and matting 126 stages described hereafter serve to enhance the depth assignment results beyond those which are produced by the depth initialization stage 136.

1.5 Pixel-Level User-Guided Operations (PLUGO)

Referring again to FIGS. 1 and 3, this section describes exemplary implementations of the optional PLUGO phase 104 of the VC technique embodiments. Generally speaking, once the RLUGO phase 102 has been completed and depths have been coarsely assigned to each frame at the region-level, the user can interact with the GUI's CCS 300 during the PLUGO phase 104 to further refine the depth assignments by adjusting depths at the pixel-level.

1.5.1 Smoothing

Referring again to FIGS. 1, 3 and 5, this section describes an exemplary implementation of the optional smoothing stage 124 of the VC technique embodiments described herein. Generally speaking, in regions of particular segmented frames that should appear smooth (such as similarly colored regions which are adjacent to each other) seams may be noticeable in such regions at the boundaries between the segments. Since matting is not applicable to similarly colored regions which are adjacent to each other, such seams can be removed from such regions in the following manner. Once the user has refined the segment depths for the one or more user-selected regions 502 of the current frame 504 in the dragging stage 118, and optionally flattened the user-selected regions in the flattening stage 120, the user can apply a smoothing procedure to smooth pixel depths for pixels within the user-selected regions of the current frame by selecting the aforementioned Smooth item 380 in the Actions pop-up sector 316 of the GUI's CCS 300. The smoothed regions 502 are then forward propagated through subsequent segmented frames in the sequence. In tested embodiments, Gaussian smoothing was employed as the smoothing procedure. Alternate embodiments are also possible which employ any other weighted averaging method as the smoothing procedure.

1.5.2 Rounding

Referring again to FIGS. 1 and 5, this section describes an exemplary implementation of an optional rounding stage 122 of the VC technique embodiments described herein. Generally speaking, the rounding stage 122 addresses the "cardboard" appearance of people and objects whose depths have been assigned to user-positioned planes in the dragging stage 118. More particularly, once the user has refined the segment depths for the one or more user-selected regions 502 of the current frame 504 in the dragging stage 118, and optionally flattened the user-selected regions in the flattening stage 120 and optionally smoothed the user-selected regions in the smoothing stage 124, the user can activate the rounding stage 122 to round the user-selected regions by selecting the aforementioned Round item 386 in the Actions pop-up sector 316 of the GUI's CCS 300.

Figure 7:
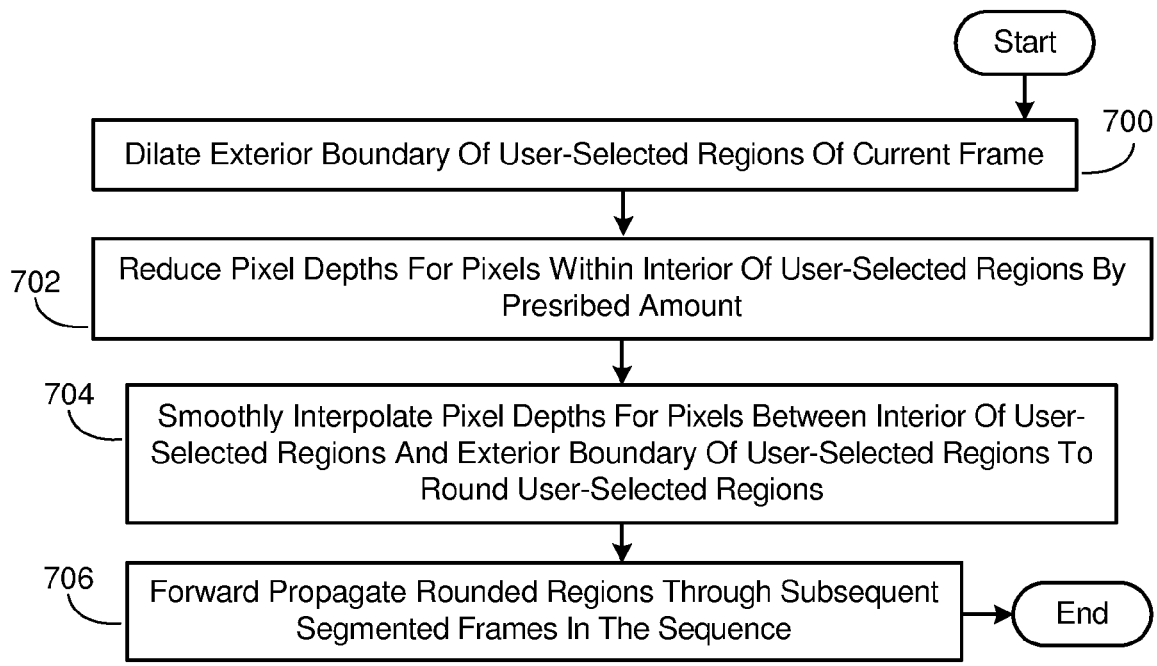
FIG. 7 is a flow diagram illustrating an exemplary embodiment of a process associated with an optional rounding stage of the user-guided conversion.

FIG. 7 illustrates an exemplary implementation of a process associated with the optional rounding stage of the VC technique embodiments. As exemplified in FIG. 7, the process starts with dilating the exterior boundary of the user-selected regions of the current frame 700. Pixel depths for pixels within the interior of the user-selected regions are then reduced by a prescribed amount 702. Pixel depths for pixels between the interior of the user-selected regions and the exterior boundary of the user-selected regions are then smoothly interpolated to round the user-selected regions 704 (i.e., give the regions a rounded appearance when viewed by the user). Finally, the rounded regions are forward propagated through subsequent segmented frames in the sequence 706. In an alternate embodiment of the rounding stage 122, additional depth cues such as shading and the like can also be incorporated into the user-selected regions to give them an even more convincing 3D appearance.

1.5.3 Matting

Referring again to FIGS. 1, 3 and 5, this section describes an exemplary implementation of the optional matting stage 126 of the VC technique embodiments described herein. Generally speaking, rendering a stereo video as an unbroken mesh creates visual artifacts at large depth discontinuities, such as the edges of certain regions appearing smeared or broken. The matting stage 126 addresses this situation by breaking the rendered mesh at the large depth discontinuities and adding a matte boundary to the foreground of the one or more user-selected regions 502 of the current frame 504 in order to smoothly blend between the foreground color and background color. Once the user has refined the segment depths for the user-selected regions 502 of the current frame 504 in the dragging stage 118, and optionally flattened the user-selected regions in the flattening stage 120, optionally smoothed the user-selected regions in the smoothing stage 124, and optionally rounded the user-selected regions in the rounding stage 122, the user can activate the matting stage 126 to matte the user-selected regions by selecting the aforementioned Build Matte item 383 in the Actions pop-up sector 316 of the GUI's CCS 300.

Figure 8:
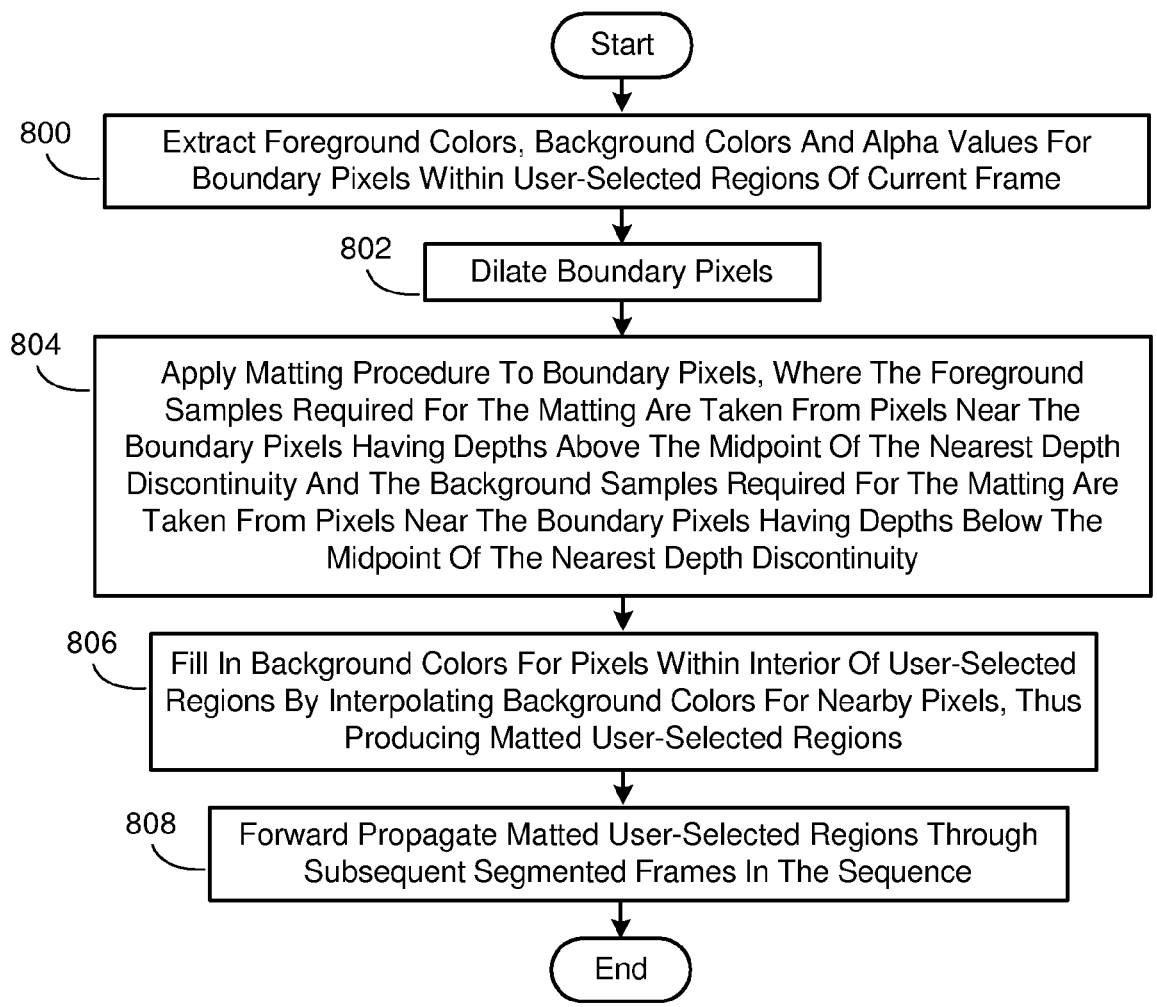
FIG. 8 is a flow diagram illustrating an exemplary embodiment of a process associated with an optional matting stage of the user-guided conversion.

FIG. 8 illustrates an exemplary implementation of a process associated with the optional matting stage of the VC technique embodiments. As exemplified in FIG. 8, the process starts with extracting foreground colors, background colors and alpha values for "boundary pixels" within the user-selected regions of the current frame, where a boundary pixel is defined as a particular pixel which, when rendered in a novel view, either significantly overlaps one of its neighboring pixels or is rendered far enough from a neighboring pixel that the color between the particular pixel and the neighboring pixel appears smeared 800. The boundary pixels are then dilated 802. A matting procedure is then applied by the user to the boundary pixels, where the foreground samples for the matting are taken from pixels near the boundary pixels that have depths above the midpoint of the nearest depth discontinuity and the background samples for the matting are taken from pixels near the boundary pixels that have depths below the midpoint of the nearest depth discontinuity 804. In tested embodiments, Bayesian matting was employed for the matting procedure, although other matting techniques can be used instead. Background colors for pixels within the interior of the user-selected regions are then filled in by interpolating the background colors for nearby pixels, thus producing matted user-selected regions 806. Finally, the matted user-selected regions are forward propagated through subsequent frames in the sequence 808.

2.0 Additional Embodiments

While the VC technique has been described in more detail by specific reference to embodiments thereof, it is understood that variations and modifications thereof can be made without departing from the true spirit and scope of the VC technique. By way of example but not limitation and referring again to FIGS. 2 and 3, in an alternate embodiment of the computing environment 208 for converting a 2D video into a stereo video, only the 2D display device 202 may be attached to the computing device 200 when a stereo display device 204 is not available. In this case, the viewing sub-sector 306 of the GUI can be configured by the user 206 to include a third viewing field (not shown) for displaying the stereo video. More particularly, the stereo video would be rendered in anaglyph format, the anaglyph formatted stereo video would be displayed to the user 206 in the third viewing field, and the user would wear a pair of conventional two-color anaglyph glasses to view the stereo video in the third viewing field.

It is also noted that any or all of the aforementioned embodiments can be used in any combination desired to form additional hybrid embodiments. Although the VC technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

This section provides a brief, general description of a suitable computing system environment in which portions of the VC technique embodiments described herein can be implemented. These VC technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 9:
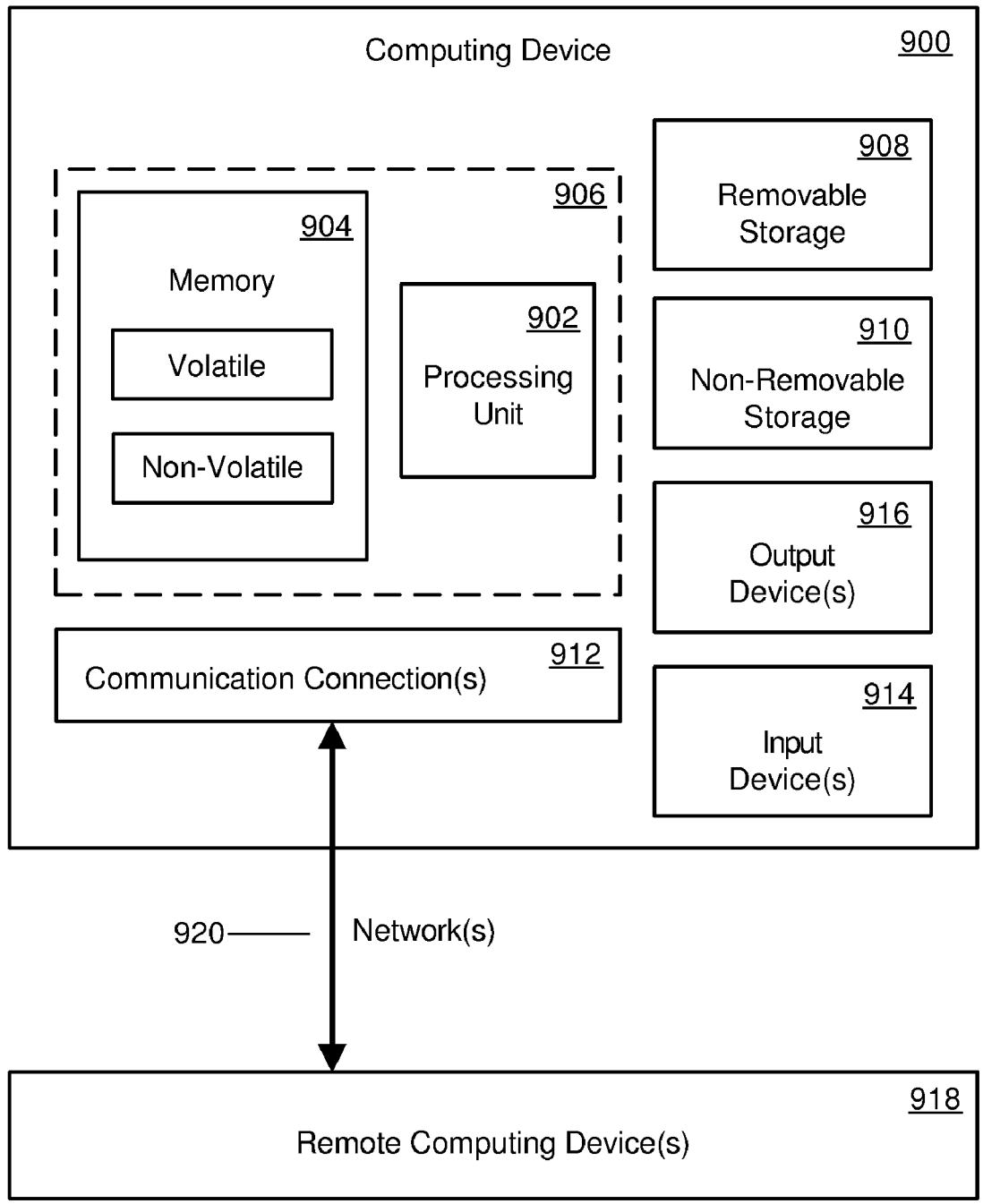
FIG. 9 is a diagram illustrating an exemplary embodiment, in simplified form, of a general purpose, network-based computing device which constitutes an exemplary system for implementing portions of the VC technique embodiments described herein.

FIG. 9 illustrates an exemplary embodiment, in simplified form, of a suitable computing system environment according to the VC technique embodiments described herein. The environment illustrated in FIG. 9 is only one example of a suitable computing system environment and is not intended to suggest any limitation as to the scope of use or functionality of the VC technique embodiments described herein. Neither should the computing system environment be interpreted as having any dependency or requirement relating to any one or combination of components exemplified in FIG. 9.

As exemplified in FIG. 9, an exemplary system for implementing portions of the VC technique embodiments described herein includes one or more computing devices, such as computing device 900. In its simplest configuration, computing device 900 typically includes at least one processing unit 902 and memory 904. Depending on the specific configuration and type of computing device, the memory 904 can be volatile (such as RAM), non-volatile (such as ROM and flash memory, among others) or some combination of the two. This simplest configuration is illustrated by dashed line 906.

As exemplified in FIG. 9, computing device 900 can also have additional features and functionality. By way of example, computing device 900 can include additional storage such as removable storage 908 and/or non-removable storage 910. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 900 such as computer readable instructions associated with an operating system, application programs and other program modules, and data structures, among other things. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 900. Any such computer storage media can be part of computing device 900.

As exemplified in FIG. 9, computing device 900 also includes a communications connection(s) 912 that allows the device to operate in a networked environment and communicate with a remote computing device(s), such as remote computing device(s) 918. Remote computing device(s) 918 can be a PC, a server, a router, a peer device, or other common network node, and typically includes many or all of the elements described herein relative to computing device 900. Communication between computing devices takes place over a network(s) 920, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 912 and related network(s) 920 described herein are exemplary and other means of establishing communication between the computing devices can be used.

As exemplified in FIG. 9, communications connection(s) 912 and related network(s) 920 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 9, computing device 900 also includes an input device(s) 914 and output device(s) 916. Exemplary input devices 914 include, but are not limited to, a keyboard, a GUI selection device such as a mouse and the like, a pen, a touch input device, a microphone, and a camera, among others. A user can enter commands and various types of information into the computing device 900 through the input device(s) 914. Exemplary output devices 916 include, but are not limited to, a display device(s), a printer, and audio output devices, among others. The user can select items in a GUI displayed on a display device via the GUI selection device. These input and output devices are well known and need not be described at length here.

Referring again to FIG. 9, the VC technique embodiments described herein can be further described in the general context of computer-executable instructions, such as program modules, which are executed by computing device 900. Generally, program modules include routines, programs, objects, components, and data structures, among other things, that perform particular tasks or implement particular abstract data types. The VC technique embodiments can also be practiced in a distributed computing environment where tasks are performed by one or more remote computing devices 918 that are linked through a communications network 912/920. In a distributed computing environment, program modules can be located in both local and remote computer storage media including, but not limited to, memory 904 and storage devices 908/910.

Wherefore, what is claimed is:

1. A computer-implemented, user-guided process for converting a two-dimensional (2D) video into a multi-view video, comprising using a computer to perform the following process actions:

inputting the 2D video, wherein the 2D video comprises a sequence of frames;

segmenting the inputted frames to generate a temporally consistent segmented 2D video comprising a sequence of segmented frames each segmented frame of which comprises a plurality of segments each segment of which encompasses one or more pixels; and generating the multi-view video, said generation comprising, employing user-guided operations to generate depth assignments for the segments associated with user-assigned regions of the segmented frames, wherein a user-assigned region is formed from a group of contiguous segments selected by the user, and the user selecting one or more regions of interest in particular segmented frames forming a sub-sequence of the segmented frames, said region selection comprising, (a) setting a first segmented frame in the sub-sequence to be a current frame, (b) the user selecting one or more groups of segments within the current frame that form the one or more regions of interest by roughly marking-out an interior of the regions of interest, (c) generating a bounding box around the selected groups of segments, (d) forward propagating the selected groups of segments through the sub-sequence of segmented frames by automatically selecting corresponding segments in subsequent segmented frames in the sub-sequence, (e) utilizing the selected groups of segments to generate an iterated graph cut segmentation of the current frame, (f) constructing a foreground color model for the selected groups of segments, (g) constructing a background color model for unselected segments residing within the bounding box, (h) optimizing the segmentation of the current frame using an iterative graph cut method, wherein the selected groups of segments are constrained as foreground, segments outside the bounding box are constrained as background, and iterations of the graph cut continue until convergence, and (i) whenever the current frame is not the last segmented frame in the sub-sequence, forward propagating the selected groups of segments and the bounding box to the next segmented frame in the sub-sequence, wherein particular segments are prevented from being propagated if they don't fit the foreground and background color models, setting the next segmented frame in the sub-sequence to be the current frame, and repeating actions (b)-(i).

2. The process of claim 1, wherein the multi-view video is a stereo video comprising a left view and a right view which are rendered from a user-selected viewpoint, further comprising actions of:

rendering the stereo video; and storing or displaying the rendered stereo video.

3. The process of claim 2, wherein, the process action of segmenting the inputted frames comprises employing a consistent segmentation method utilizing segment sizes which are sufficiently small enough so as to minimize the segments in each segmented frame having pixels belonging to two different objects, and wherein the consistent segmentation method produces a temporally consistent segmentation wherein corresponding segments across one or more segmented frames have similar shapes and colors and segment boundaries are similar across the one or more segmented frames.

4. The process of claim 1, wherein the process action of generating the multi-view video further comprises an action of initializing the segment depths for the segmented frames, and wherein the process action of the user selecting one or more regions of interest in particular segmented frames further comprises an action of the user performing a dragging operation to refine the initialized segment depths for the selected groups of segments in the current frame.

5. The process of claim 1, wherein, the 2D video comprises one or more scenes each scene of which comprises a sub-sequence of frames, and the process action of segmenting the inputted frames comprises an action of performing structure from motion (SFM) processing on the inputted frames to recover a set of feature points and camera parameters for frames in particular scenes which were filmed with a moving camera, each feature point specifying a three-dimensional position, a color and a list of correspondences which specify particular frames in which said feature point is visible.

6. The process of claim 5, wherein the process action of the user selecting one or more regions of interest in particular segmented frames further comprises actions of:

the user selecting one or more groups of segments within the current frame that form one or more dynamic regions each of which comprises one or more moving objects;

the user masking said selected groups of segments; and the user deleting the feature points associated with said masked groups of segments.

7. The process of claim 5, wherein the process action of generating the multi-view video further comprises an action of initializing the segment depths for the segmented frames, said segment depth initialization comprising actions of:

whenever a particular scene was filmed with a moving camera, (i) setting the first segmented frame in the sub-sequence associated with the scene to be the current frame, (ii) constructing a graph cut for the current frame wherein each segment in the current frame is assigned a node at each of a series of depth layers covering a depth range of the set of feature points recovered for the current frame, (iii) connecting each node to a corresponding node in adjacent depth layers, (iv) connecting each node to its neighboring nodes within each layer, (v) generating edge weights within each layer by employing a cost function encouraging segments with similar appearance to be assigned the same depth, (vi) generating weights between the layers by employing an exponential cost function encouraging cuts separating surface from space to follow the distribution of feature point depths, wherein for each span of nodes corresponding to a segment said cost function penalizes the distance of the segment depth set by a cut from a weighted mean of depths for feature points within a prescribed window around a centroid of the segment, (vii) generating a weight for each segment depth based on the 2D distance of the feature points from the centroid of the segment, a difference in color between the feature points and the segment, and a feature confidence value generated by the SFM processing, said weight generation also employing a variance term which reduces the cost of cuts which are far from the weighted mean of depths for feature points within said window if the spread of depths in said window is wide or the sum of feature point weights is low, and (viii) whenever the current frame is not the last segmented frame in the sub-sequence, projecting the centroid of each segment in the current frame into the next segmented frame in the sub-sequence and adding the corresponding feature points to the set of feature points for said next segmented frame with low feature confidence values, setting said next segmented frame to be the current frame, and repeating actions (ii)-(viii); and whenever a particular scene was filmed with a stationary camera, assigning segments in each segmented frame in the sub-sequence associated with the scene a feature point having a prescribed common depth and a low feature confidence value.

8. The process of claim 7 wherein, a handle resides at each corner of the bounding box, and the process action of the user selecting one or more regions of interest in particular segmented frames further comprises an action of the user performing a dragging operation to refine the initialized segment depths for the selected groups of segments in the current frame, said dragging operation comprising an action of the user setting a position and orientation of a plane onto which the selected groups of segments are projected, wherein, the user clicking and dragging within the user-selected regions moves the plane's position along a central z-axis, the user clicking and dragging a single handle residing on a particular corner of the bounding box changes the plane's orientation around the z-axis by moving the particular corner's position along the z-axis while the position of the corner opposite the particular corner remains fixed, the user clicking and dragging two adjacent handles residing on a particular edge of the bounding box changes the plane's orientation around the z-axis by moving the particular edge's position along the z-axis while the position of the edge opposite the particular edge remains fixed, the user clicking to select the whole video mesh and then dragging the selected mesh adjusts a global depth offset, whenever the user-selected regions comprise no moving objects, the user right-clicking and dragging applies changes made to the plane's position and orientation in the current frame to all subsequent segmented frames in the segmented 2D video in which said regions have been selected by the user, whenever the user-selected regions comprise one or more moving objects, the user left-clicking and dragging changes the plane's position and orientation in the current frame and interpolates said changes for segmented frames between the current frame and the next segmented frame in the sequence in which refinement of the segment depths for the selected group of segments has also been made by the user, and whenever the user-selected regions comprise multiple depths, depth offsets from the plane are maintained throughout the dragging operation.

9. The process of claim 8, wherein the process action of the user selecting one or more regions of interest in particular segmented frames further comprises an action of the user performing a flattening operation to remove discontinuities between disjoint segments in the current frame that should have the same depth, said flattening operation comprising actions of:

the user flattening the selected groups of segments resulting in high edge weights being generated for edges between segments in said selected groups thus encouraging the graph cut to assign consistent depths for the segments in said selected groups during the segment depth initialization; and forward propagating the flattened selected groups of segments through subsequent segmented frames in the subsequence.

10. The process of claim 8, wherein, the dragging operation is utilized to update the set of feature points for the current frame by manually adjusting the depth of particular segments for which high weights are generated in order to force said particular segment depths to be observed in the segment depth initialization, said adjustment of the depth of particular segments replaces any feature points for the particular segments that previously existed in the set of feature points with new feature points for any frames in which the new feature points lie, and whenever the user selects a border around the region of interest, feature points are replaced and depths are adjusted only for segments whose centroid resides within an interior of the border.

11. The process of claim 10, wherein the process action of the user selecting one or more regions of interest in particular segmented frames further comprises actions of:

the user performing a smoothing operation to remove seams at boundaries between the segments in regions of the current frame that should otherwise appear smooth such as similarly colored regions which are adjacent to each other, said smoothing operation comprising actions of, the user applying a smoothing procedure to smooth pixel depths for pixels within the user-selected regions of the current frame, and forward propagating the smoothed regions through subsequent segmented frames in the sequence; and the user performing a rounding operation to round said user-selected regions, said rounding operation comprising actions of, dilating an exterior boundary of said user-selected regions, reducing pixel depths for pixels within an interior of said user-selected regions by a prescribed amount, smoothly interpolating pixel depths for pixels between the interior of said user-selected regions and an exterior boundary of said user-selected regions to round said user-selected regions, and forward propagating said rounded regions through subsequent segmented frames in the sequence.

12. The process of claim 10, wherein the process action of the user selecting one or more regions of interest in particular segmented frames further comprises an action of the user performing a matting operation to add a matte boundary to a foreground of the user-selected regions of the current frame in order to smoothly blend between foreground color and background color, the matting operation comprising actions of:

extracting foreground colors, background colors and alpha values for boundary pixels within said user-selected regions, wherein a boundary pixel comprises a particular pixel which when rendered in a novel view either significantly overlaps one of its neighboring pixels or is rendered far enough from a neighboring pixel that the color between the particular pixel and the neighboring pixel appears smeared;

dilating the boundary pixels;

the user applying a matting procedure to the boundary pixels, wherein foreground samples are taken from pixels near the boundary pixels having depths above the midpoint of a nearest depth discontinuity, and background samples are taken from pixels near the boundary pixels having depths below the midpoint of the nearest depth discontinuity;

filling in background colors for pixels within an interior of said user-selected regions by interpolating the background colors for nearby pixels, thus producing matted user-selected regions; and forward propagating said matted regions through subsequent segmented frames in the sequence.

13. In a computer system having a graphical user interface comprising a two-dimensional (2D) display device and a user interface selection device, a user-guided computer-implemented process for converting a 2D video into a stereo video, wherein the 2D video comprises a sequence of frames and is preprocessed to generate a temporally consistent segmented 2D video comprising a sequence of segmented frames each segmented frame of which comprises a plurality of segments, and wherein a pair of virtual cameras is employed in rendering the stereo video, said process comprising using a computer to perform the following process actions:

displaying a conversion control sector (CCS) on the 2D display device said CCS comprising a plurality of sub-sectors including viewing sub-sector and a playback control sub-sector, said playback control sub-sector comprising, a leftmost slider control element which is utilized by the user to adjust a horizontal separation between said virtual cameras, a rightmost slider control element which is utilized by the user to adjust a distance of said virtual cameras from the scene, wherein, adjusting said distance results in a focal length modification in order to maintain a viewing angle that keeps the whole scene in view, and results of said virtual camera adjustments are immediately displayed in the editing view of the current frame whenever the editing view of the current frame is displayed in the viewing sub-sector, a play icon which is selected by the user to initiate playback of the rendered stereo video, a stop icon which is selected by the user to cease said playback, a pause icon which is selected by the user to pause said playback, a fast forward icon which is selected by the user to initiate a fast-forwarding of said playback, and a rewind icon which is selected by the user to initiate a rewinding of said playback; and inputting commands entered by the user via said selection device to generate the stereo video, said generation comprising the establishment of depth assignments for the segments associated with each region of the segmented frames, wherein a region is formed from a group of contiguous segments selected by the user.

14. The process of claim 13, wherein said viewing sub-sector comprising one of:

a first viewing field in which a current frame in the 2D video is displayed and a second viewing field in which an editing view of said current frame is displayed; or a single viewing field in which either said current frame is displayed or an editing view of said current frame is displayed; or said first viewing field, said second viewing field and a third viewing field in which the stereo video is displayed in anaglyph format, wherein, the editing view of said current frame depicts three-dimensional (3D) structure of a scene within said current frame from a user-selected viewpoint, thus allowing the user to view the depths assigned to particular regions of the scene.

15. The process of claim 14, wherein the process action of displaying a CCS on the 2D display device further comprises an action of displaying a timeline control sub-sector within the CCS, said timeline control sub-sector comprising:

a timeline slider control element which is utilized by the user to navigate to any point in time in the 2D video; and a thumbnail representation of a limited sequence of frames in the 2D video, wherein, a first frame in the limited sequence is the frame in the 2D video corresponding to a particular point in time navigated to by the timeline slider control element, subsequent frames in the limited sequence are the frames in the 2D video that immediately follow the first frame, and the first frame is automatically displayed in the viewing sub-sector, upon the user selecting another frame in the limited sequence, the selected frame is displayed in the viewing sub-sector, the particular frame in the limited sequence that is displayed in the viewing sub-sector is highlighted via a border around said frame, and upon the user adjusting the timeline slider control element to a new point in time, the limited sequence of frames is updated based on the new point in time.

16. The process of claim 13, wherein the process action of displaying a CCS on the 2D display device further comprises an action of displaying a tools sub-sector within the CCS, said tools sub-sector comprising:

a rotate camera icon which is selected by the user to rotate a camera used to render the editing view of the current frame around the scene within the current frame, zoom in on said scene and zoom out from said scene whenever said editing view is displayed in the viewing sub-sector;

a translate camera icon which is selected by the user to translate the camera used to render said editing view in an image plane and zoom whenever said editing view is displayed in the viewing sub-sector;

a select regions icon which is selected by the user to mark-out regions of interest to be selected; and a drag icon which is selected by the user to perform a variety of dragging operations to refine depths for the selected regions.

17. The process of claim 16, wherein the process action of displaying a CCS on the 2D display device further comprises an action of displaying a menu sub-sector within the CCS, said menu sub-sector comprising:

a File menu item, wherein upon the user selecting the File menu item a scrollable File pop-up sector is displayed comprising, an Open AVI item the user selection of which allows the user to load a particular 2D video to work on, a Load Segments item the user selection of which loads the segmented 2D video generated from the 2D video, a Load SFM item the user selection of which loads feature points and camera parameters recovered from the 2D video via structure from motion (SFM) processing, an Erase Features item the user selection of which deletes feature points for segments which have been masked, and a Save BMPs item the user selection of which renders a left view and right view of the stereo video as separate bit maps (BMPs);

a View menu item, wherein upon the user selecting the View menu item a scrollable View pop-up sector is displayed comprising, an Edit/View/Split item the user selection of which allows the user to configure the viewing sub-sector such that one of, both the current frame in the 2D video and the editing view of said current frame are displayed (Split), or only the current frame in the 2D video is displayed (Video), or only the editing view of said current frame is displayed (Edit), a Free View/Frame View item the user selection of which allows the user to choose between a Free View perspective and a Frame View perspective of what is displayed in the editing view of said current frame, wherein, in the Free View perspective pixel depths are rendered and the user is able to rotate their viewing perspective around the scene within said current frame, and in the Frame View perspective said scene is rendered from a front-on perspective with no depth, a Draw Segments item the user selection of which shows the segmentation for what is displayed in the editing view of said current frame, wherein each segment is rendered with a random color thus making the segmentation viewable by the user, and a Render Anaglyph item the user selection of which renders the stereo video in anaglyph format;

an Options menu item wherein upon the user selecting the Options menu item a scrollable Options pop-up sector is displayed comprising a Select Border item a first user selection of which selects a border around the selected regions such that whenever the stereo video is updated segments belonging to the border will be assigned new depths while segments not belonging to the border will not be assigned new depths, and a second user selection of which de-selects the selected border; and an Actions menu item wherein upon the user selecting the Actions menu item a scrollable Actions pop-up sector is displayed comprising, a Flatten item the user selection of which flattens the selected regions, a Smooth item the user selection of which smooths the depths within the selected regions, a Round item the user selection of which rounds the selected regions, a Mask Segments item the user selection of which masks segments within the selected regions, an Update 3D item the user selection of which updates the stereo video by performing a graph cut with the latest depth assignments, a Build Matte item the user selection of which enhances the stereo video by performing a matting operation on the selected regions, and a Render & Save item the user selection of which renders the stereo video to textures and saves a copy of the rendered stereo video.

18. A computer-implemented, user-guided process for converting a two-dimensional (2D) video into a stereo video, comprising using a computer to perform the following process actions:

inputting the 2D video, wherein the 2D video comprises a sequence of frames and one or more scenes;

segmenting the inputted frames using a consistent segmentation method to generate a temporally consistent segmented 2D video comprising a sequence of segmented frames each segmented frame of which comprises a plurality of segments each segment of which encompasses one or more pixels, wherein the consistent segmentation method utilizes segment sizes which are sufficiently small enough so as to minimize the segments in each segmented frame having pixels belonging to two different objects, corresponding segments across one or more segmented frames have similar shapes and colors, and segment boundaries are similar across the one or more segmented frames;

performing structure from motion processing on the inputted frames to recover a set of feature points and camera parameters for frames in particular scenes which were filmed with a moving camera, each feature point specifying a three-dimensional position, a color and a list of correspondences which specify particular frames in which said feature point is visible; and generating the stereo video by employing user-guided operations to generate depth assignments for the segments associated with user-assigned regions of the segmented frames, wherein a user-assigned region is formed from a group of contiguous segments selected by the user, said stereo video generation comprising actions of, initializing the segment depths for the segmented frames, the user selecting one or more regions of interest in particular segmented frames forming a sub-sequence of the segmented frames, said region selection comprising actions of, (a) setting a first segmented frame in the sub-sequence to be a current frame, (b) the user selecting one or more groups of segments within the current frame that form the one or more regions of interest by roughly marking-out an interior of the regions of interest, (c) generating a bounding box around the selected groups of segments, (d) forward propagating the selected groups of segments through the sub-sequence of segmented frames by automatically selecting corresponding segments in subsequent segmented frames in the sub-sequence, (e) utilizing the selected groups of segments to generate an iterated graph cut segmentation of the current frame, (f) constructing a foreground color model for the selected groups of segments, (g) constructing a background color model for unselected segments residing within the bounding box, (h) optimizing the segmentation of the current frame using an iterative graph cut method, wherein the selected groups of segments are constrained as foreground, segments outside the bounding box are constrained as background, and iterations of the graph cut continue until convergence, and (i) whenever the current frame is not the last segmented frame in the sub-sequence, forward propagating the selected groups of segments and the bounding box to the next segmented frame in the sub-sequence, wherein particular segments are prevented from being propagated if they don't fit the foreground and background color models, setting the next segmented frame in the sub-sequence to be the current frame, and repeating actions (b)-(i), the user performing a dragging operation to refine the initialized segment depths for the selected groups of segments in the current frame, said dragging operation comprising an action of the user setting a position and orientation of a plane onto which the selected groups of segments are projected, the user performing a flattening operation to remove discontinuities between disjoint segments in the current frame that should have the same depth, the user performing a smoothing operation to remove seams at boundaries between the segments in regions of the current frame that should otherwise appear smooth such as similarly colored regions which are adjacent to each other, the user performing a rounding operation to round the user-selected regions of the current frame, and the user performing a matting operation to add a matte boundary to a foreground of the user-selected regions of the current frame in order to smoothly blend between foreground color and background color.

* * * * *